United States Patent [19]

Sakuragawa

[11] Patent Number: 5,081,332
[45] Date of Patent: Jan. 14, 1992

[54] ELECTRICAL DISCHARGE MACHINE WITH A MANAGEMENT INFORMATION DISPLAY FUNCTION

[75] Inventor: Tomonobu Sakuragawa, Yamanashi, Japan

[73] Assignee: Fanuc Ltd., Yamanashi, Japan

[21] Appl. No.: 499,543

[22] PCT Filed: Oct. 31, 1989

[86] PCT No.: PCT/JP89/01127
§ 371 Date: Jul. 2, 1990
§ 102(e) Date: Jul. 2, 1990

[87] PCT Pub. No.: WO90/05040
PCT Pub. Date: May 17, 1990

[30] Foreign Application Priority Data

Nov. 4, 1988 [JP] Japan .................. 63-277464

[51] Int. Cl.⁵ .................. B23H 7/20; B23H 7/02; B23Q 17/00
[52] U.S. Cl. .................. 219/69.13; 219/69.12; 219/69.14; 364/474.04
[58] Field of Search .................. 219/69.13, 69.14, 69.11, 219/68, 69.1, 69.19; 364/474.04, 474.01, 474.13, 474.15, 474.16, 474.17

[56] References Cited

U.S. PATENT DOCUMENTS 4,685,064 8/1987 Kinoshita .................. 364/585.17
4,980,532 12/1990 Morishita .................. 219/69.13

FOREIGN PATENT DOCUMENTS 46-24599 8/1971 Japan .
57-178643 11/1982 Japan .................. 364/474.17
60-238257 11/1985 Japan .
63-134126 6/1988 Japan .................. 219/69.11
64-16318 1/1989 Japan .................. 219/69.13

Primary Examiner—Geoffrey S. Evans
Attorney, Agent, or Firm—Staas & Halsey

[57] ABSTRACT

A wire cutting electric discharge machine having a first and second group of expendable components, the first group of components being continuously used during machining including the upper and lower wire guides, the upper and lower wire feeders, the filter, and the ion exchange resin of the ion exchanger. The second group of expendable components includes a cutter for wire cutting, and the conveyor belts. At the end of a process involving cutting of the wire and wire extension, the cumulative frequency of use is compared to determine whether the life of the first group of components has terminated. At the end of machining, the CPU compares the working period of each of the second group of components obtained by adding the electric discharge machining time to the cumulative working period before the start of the machining, with an allowable working period read from a management table, to determine whether the life of each component in the second group has terminated. The CPU turns on LEDs which correspond to the exhausted component and that a first or second tanks of a machining fluid supplying device whose water level is lowered, thereby giving an alarm.

4 Claims, 4 Drawing Sheets

FIG.4

| PART NAME | INITIAL VALUE | VARIABLE | LIFE RETENTION/END INDICATING INFORMATION |
|---|---|---|---|
| WIRE GUIDE | TA(1) | T(1) | S(1) |
| FEEDER | TA(2) | T(2) | S(2) |
| FILTER | TA(3) | T(3) | S(3) |
| STRAINER | TA(4) | T(4) | S(4) |
| ION EXCHANGER | TA(5) | T(5) | S(5) |
| CUTTER | TA(6) | T(6) | S(6) |
| BELT | TA(7) | T(7) | S(7) |

ELECTRICAL DISCHARGE MACHINE WITH A MANAGEMENT INFORMATION DISPLAY FUNCTION

TECHNICAL FIELD

The present invention relates to an electrical discharge machine with a management information indicating function, and more particularly, to an electrical discharge machine in which expendable parts can be replaced at an appropriate time and a drop of the machining fluid storage level can be quickly coped with.

BACKGROUND ART

If an electrical discharge machine is operated for a long period of time, various expendable parts of the electrical discharge machine wear away and suffer deterioration in performance, thus possibly entailing a trouble which disables operation, as well as reduction in machining accuracy and machining speed. Accordingly, the exhausted parts must be replaced with new ones. Conventionally, an operator determines whether the life of each expendable part has terminated, on the basis of visual observation or experience. It is difficult, therefore, to replace each part at an appropriate time. If the time for the part replacement is too early, the operation cost of the electrical discharge machine increases. If the time is too late, on the other hand, the aforesaid awkward situation is entailed.

Further, the electrical discharge machine supplies a machining fluid to predetermined regions, such as the gap between a workpiece and an electrode, a workpiece stand, etc., by injection, thereby removing heat and machining chips produced during electrical discharge machining. If the machining fluid storage level in a machining fluid reservoir extraordinarily drops due to anything unusual in a machining fluid supplying device or the like, however, the machining fluid cannot be normally supplied, so that the operation of the electrical discharge machine is hindered.

DISCLOSURE OF THE INVENTION

The object of the present invention is to provide an electrical discharge machine capable of indicating a termination of the life of expendable parts, thereby rationalizing the time for replacement, and preferably also indicating an extraordinary drop of the machining fluid storage level, whereby the drop of the machining fluid storage level can be quickly coped with.

. In order to achieve the above object, according to the present invention, there is provided an electrical discharge machine with a management information indicating function, the electrical discharge machine having at least one of first and second part groups, the first part group including at least one expendable part continually used during electrical discharge machining, the second part group including at least one expendable part used as required during the operation of the electrical discharge machine.

This electrical discharge machine comprises: detecting means for executing detection of the working period of the at least one expendable part, included in the first part group, during the time interval between the start of the electrical discharge machining and a first predetermined point of time, and/or detection of the frequency of use of the at least one expendable part, included in the second part group, during the time interval between the start of operation of the electrical discharge machine and a second predetermined point of time; updating means for updating a corresponding one of the cumulative working period and the cumulative frequency of use of each of the expendable parts in accordance with a corresponding one of the working period and the frequency of use thus detected; discriminating means for making comparison between the updated cumulative working period and the allowable working period of the expendable part and/or comparison between the updated cumulative frequency of use and the allowable frequency of use of the expendable part, thereby determining whether the life of each of the expendable parts has terminated; and indicating means for indicating a termination of the life of each of the expendable parts in accordance with the result of determination by the discriminating means.

Preferably, the electrical discharge machine includes a machining fluid supplying device having a machining fluid reservoir and adapted to supply a machining fluid to a predetermined region of the electrical discharge machine, and second detecting means for detecting the storage level of the machining fluid in the machining fluid reservoir, the discriminating means compares the machining fluid storage level thus detected and a predetermined level, and the indicating means indicates an extraordinary drop of the machining fluid storage level in accordance with the result of the comparison.

According to the present invention, as described above, a termination of the at least one expendable part of the electrical discharge machine is indicated when the cumulative working period or the cumulative frequency of use of this part, updated in accordance with the working period of the part detected during the time interval between the start of the electrical discharge machining and the first predetermined point of time or the frequency of use during the time interval between the start of operation of the electrical discharge machine and the second predetermined point of time, attains the allowable working period or the allowable frequency of use of the part. Accordingly, an operator can properly judge the time for the replacement of the expendable part without any visual observation or experience. Thus, lowering of the electrical discharge machining accuracy attributable to inappropriateness of the time for the part replacement, occurrence of trouble in the electrical discharge machine, etc. can be prevented, and the operation cost of the electrical discharge machine can be reduced. Since the extraordinary drop of the machining fluid storage level is preferably indicated, the operator can quickly take a necessary measure to meet the situation, so that the operation of the electrical discharge machine cannot be hindered by the extraordinary drop of the machining fluid storage level.

BRIEF DESCRIPTION OF THE DRAWINGS

FIG. 4 is a diagram showing a management table stored in a random access memory shown in FIG. 1;

BEST MODE OF CARRYING OUT THE INVENTION

Figure 1:
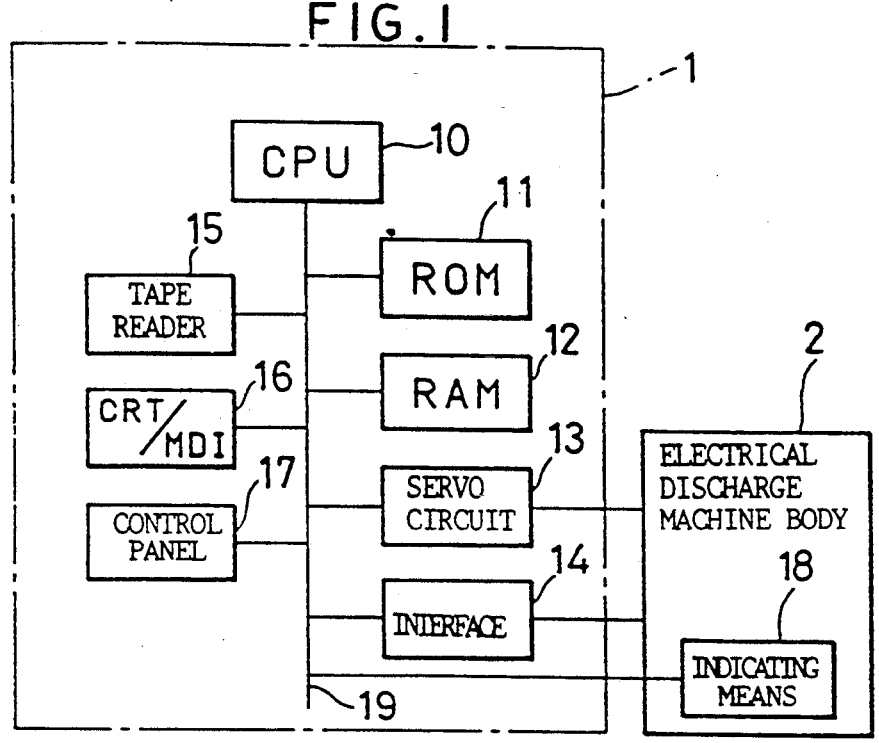
FIG. 1 is a block diagram showing the principal part of a wire-cut electrical discharge machine with a management information indicating function according to one embodiment of the present invention.

Referring to FIG. 1, a wire-cut electrical discharge machine according to one embodiment of the present invention comprises a conventional machine body 2. The machine body 2 is provided with a table (not shown) movable within a horizontal plane, and a workpiece stand for carrying a workpiece and a machining fluid pan surrounding the same are fixed to the top surface of the table. Further, the machine body 2 is provided with a conventional wire transportation device, which includes upper and lower wire guides, a guide roller, a motor, a pair of feed rollers, and a pair of conveyor belts, and a conventional automatic wire extension device including a cutter for wire cutting. While executing electrical discharge machining, the machine body 2 transports a wire electrode to a wire recovery box, along a wire transportation path which extends through nozzles attached individually to the upper and lower wire guides, and drives the cutter for wire cutting and the like of the wire extension device, thereby automatically effecting wire extension. The machine body 2 is further provided with an electrical discharge machining power source unit (not shown), and a voltage from this power source unit is applied to the wire through upper and lower feeders so that electric discharge is caused in the gap between the workpiece and the wire.

Also, the electrical discharge machine comprises a machining fluid supplying device for supplying a machining fluid to a predetermined region of the machine body 2, e.g., the electric discharge gap. This device includes a machining fluid reservoir which is composed of a first tank 4 for storing clean water as the machining fluid and a second tank 3 for storing contaminated water, whereby clean water is supplied from a water main to the first tank 4. A strainer and a filter, used to remove impurities contained in the contaminated water, are interposed between the two tanks 3 and 4. An ion exchanger for adjusting the electrical conductance of the clean water as the machining fluid is attached to the first tank 4, and the peripheral wall of the second tank 3 is provided with a machining fluid discharge port which is located below the upper edge of a partition wall dividing the two tanks, with respect to the direction of the height of the device. The tanks 3 and 4 are provided with water level detectors 5 and 6, respectively, each having one end fixed to the peripheral wall of the tank and a free end attached to a float 5a or 6a.

Further, the electrical discharge machine comprises a numerical control device (hereinafter referred to as NC device) 1 for controlling the operation of the machine body 2, and the NC device includes a central processing unit (hereinafter referred to as CPU) 10. The CPU 10 is connected, by means of a bus 19, with a read-only memory (ROM) 11 stored with an NC device control program, and a nonvolatile random access memory (RAM) 12 of a battery-backup type for storing a machining program and a table for part life management (hereinafter referred to as management table) 20 which will be mentioned later with reference to FIG. 4.

In the present embodiment, expendable parts to be subjected to life management include a first part group composed of parts individually continually used during the electrical discharge machining and a second part group composed of parts individually used as required during the electrical discharge machining. The first expendable part group includes the upper and lower wire guides, the upper and lower feeders, the filter and the strainer for machining fluid filtration, and ion exchange resin of the ion exchanger. The second expendable part group, on the other hand, includes the cutter for wire cutting and the belts of the automatic wire extension device. As shown in FIG. 4, the management table 20 has first to fourth memory regions for storing management items, including part names, initial values, variables, and life retention/end indicating information, fifth to eleventh memory regions for storing the names of the aforesaid seven expendable parts as objects of management, twelfth to eighteenth memory regions for storing initial values TA(1) to TA(7) individually indicating the life performance of the aforesaid various parts, that is, the allowable working period of the parts included in the first part group and the allowable frequency of use of the parts included in the second part group, nineteenth to twenty-fifth memory regions for storing variables T(1) to T(7) individually indicating the cumulative working period of the parts included in the first part group and the cumulative frequency of use of the parts included in the second part group, and twenty-sixth to thirty-second memory regions for storing data S(1) to S(7) indicating whether the life of each part has terminated. For example, the initial values TA(1) to TA(7) are adjusted to values for the time of delivery of the electrical discharge machine, while the variables T(1) to T(7) are reset to the value "0" at the time of delivery of the electrical discharge machine and at the time of replacement of their corresponding expendable parts.

Further, the CPU 10 is connected, by means of the bus 19, with a servo circuit 13 for controlling the drive of servomotors for various axes in the machine body 2, an interface 14 connected with various sensors in the machine body 2, the water level detectors 5 and 6, etc., a tape reader 15 for reading the machining program from a tape, a manual data input device 16 with CRT display (hereinafter referred to as CRT/MDI), and a machine control panel 17 for operating the NC device and setting various conditions including electrical discharge machining conditions. Furthermore, the CPU 10 is connected, by means of the bus 19, with indicating means 18 which, including a required number of light emitting diodes, is used to indicate a termination of the life of the expendable parts and an extraordinary drop of the machining fluid storage level.

Figure 5:
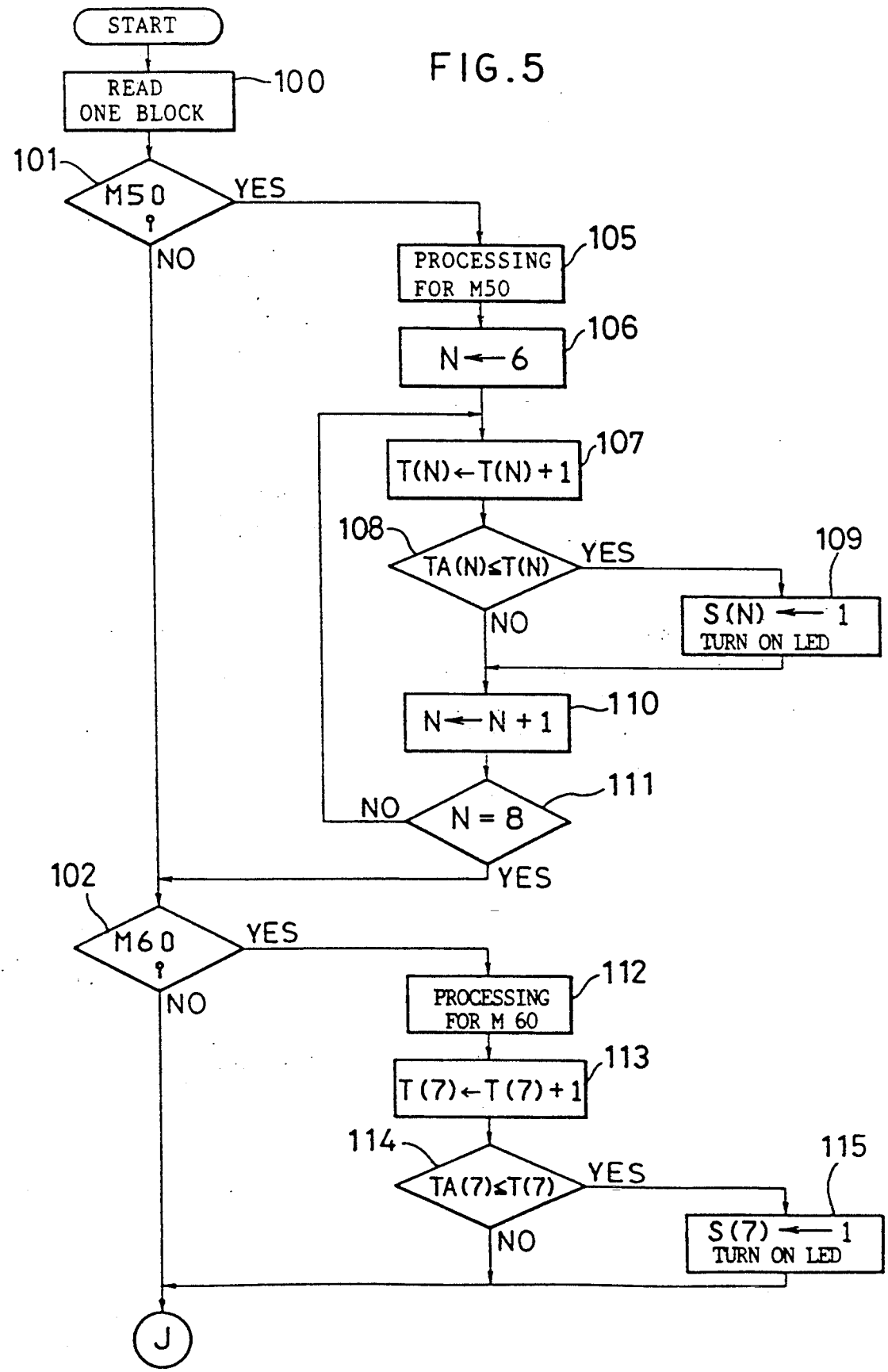
FIG. 5 is a flow chart showing the first half of a control program executed by a central processing unit shown in FIG. 1.
Figure 6:
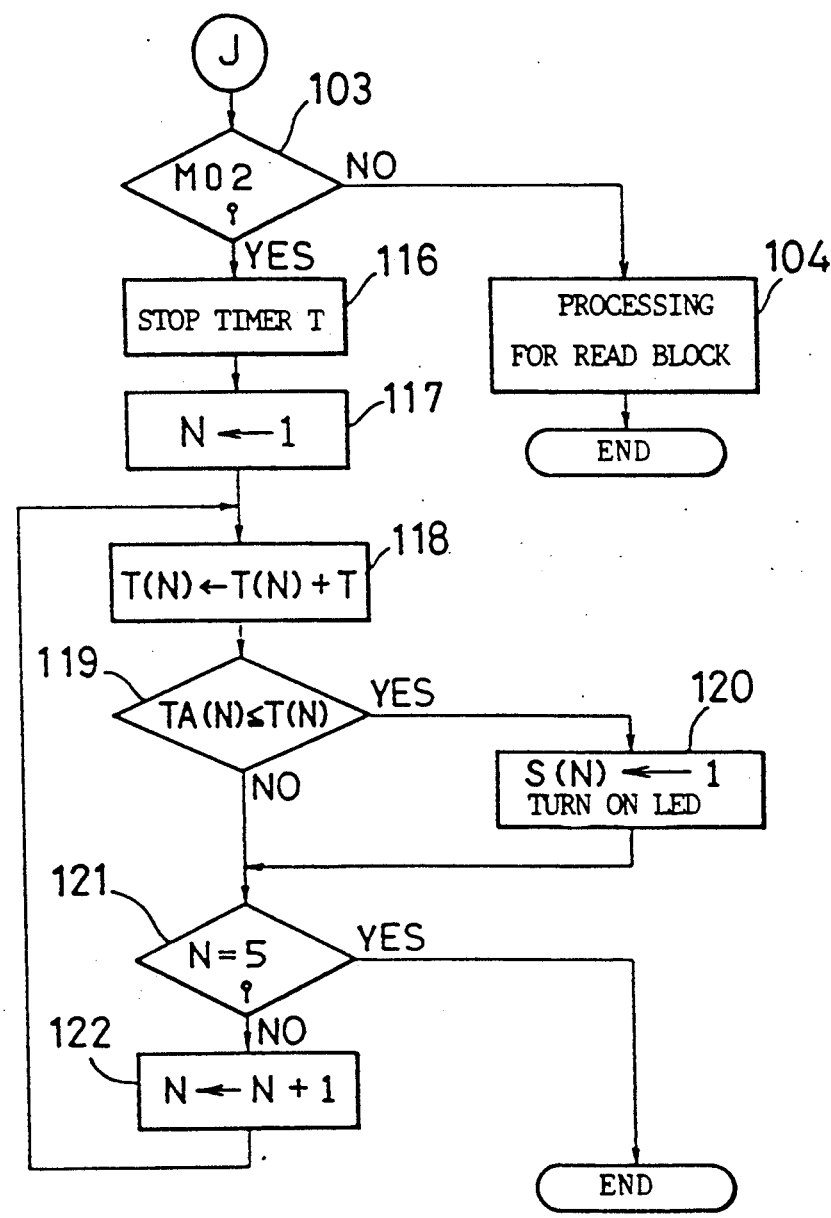
FIG. 6 is a flow chart showing the second half of the control program of FIG. 5.

Referring now to FIGS. 5 and 6, the operation of the electrical discharge machine with the aforementioned construction will be described.

If an operator inputs a command for the start of electrical discharge machining through the machine control panel 17 after connecting the electrical discharge machine to the power supply, the CPU 10 restarts a timer contained therein, and then periodically executes the control program shown in FIGS. 5 and 6.

First, the CPU 10 reads a first block (in general, one machining program block) of the machining program from the tape reader 15 or the RAM 12 (Step 100), and determines whether a wire cut/removal command M50 for automatic wire extension is described in this block (Step 101). If the result of determination in this step is negative, whether a wire extension command M60 is described in the block read in Step 100 is determined (Step 102). If the result of determination in this step is negative, whether a command M02 indicative of an end of the machining program is described is determined (Step 103). If the results of determination in Steps 101 to 103 are all negative, a required process is executed in accordance with the command described in the block read in Step 100 (Step 104), whereupon the program of FIGS. 5 and 6 for the present control program execution period (hereinafter referred to as control period) is finished.

If the result of determination in Step 101 for a subsequent control period is positive, that is, if the wire cut/removal command M50 is read, the electrical discharge machine executes a wire cut/removal process (Step 105). Namely, after the execution of the electrical discharge machining and the supply of the machining fluid are stopped individually, the wire is cut by means of the cutter, and the paired belts of the wire transportation device are then driven to throw a cut wire half portion on the lower-course side, with respect to the cutter, into the wire recovery box.

Then, the CPU 10 adjusts an index N, indicative of an expendable part name, to the value "6" which represents the cutter for wire cutting (Step 106). As a result, the twenty-fourth memory region of the management table 20, stored with the variable T(6), is addressed, and the variable T(6) is read from the management table 20, although a detailed explanation is omitted herein. Seeing that the cutter has been used once in the aforesaid wire cutting process, the CPU 10 adds the value "1" to the variable T(6), thereby updating the variable to a value indicative of the cumulative frequency of use of the cutter after the wire cutting process, and the variable T(6) thus updated is then stored in the aforesaid memory region (Step 107). Then, the initial value TA(6) indicative of the allowable frequency of use of the cutter and the updated variable T(6) indicative of the cumulative frequency of use of the cutter, read from the seventeenth and twenty-fourth memory regions of the management table 20, respectively, are compared to determine whether the cutter life has terminated (Step 108). If the result of determination in this step is positive, the life retention/end indicating data S(6) of the value "1," indicative of a termination of the cutter life, is written in the thirty-first memory region of the management table 20, and a required output signal is delivered to the indicating means 18 to turn on that one of the light emitting diodes which corresponds to the cutter, thereby warning of the termination of the cutter life (Step 109), whereupon the program proceeds to Step 110. If the result of determination in Step 108 is negative, on the other hand, the program proceeds directly from Step 108 to Step 110 without going through Step 109.

After the value "1" is added to the index N to update the index N to the value "7" in Step 110, whether the index N is equal to the value "8" is determined (Step 111). Since the result of determination in this step is negative, the value "1" is added to the variable T(7) indicative of the cumulative frequency of use of the paired belts of the wire transportation device, in view of the fact that the paired belts have been used once in the wire removal process, whereby the variable T(7) is updated to a value indicative of the cumulative frequency of use of the belts after the wire removal process in Step 105 (Step 107). The variable T(7) thus updated is stored in the thirty-second memory region of the management table 20, and this variable and the initial value TA(7), indicative of the allowable frequency of use of the belts and read from the eighteenth memory region, are compared to determine whether the life of the belts has terminated (Step 108). If the result of determination in this step is positive, the data S(7) for the value "1," indicative of a termination of the belt life, is written in the thirty-second memory region of the management table 20, and a corresponding light emitting diode of the indicating means 18 is turned on the warn of the termination of the belt life (Step 109), whereupon the program proceeds to Step 110 mentioned before. If the result of determination in Step 108 is negative, the program proceeds directly from this step to Step 110. Subsequently, the index N is updated to the value "8" in Step 110, so that the result of determination in Step 111 is positive, and the program proceeds to Step 102. In the control period during which the wire cut/removal process is executed, the results of determination in Step 102 and Step 103 subsequent thereto are both negative, so that the program proceeds to Step 104. In this case, the wire cut/removal process is already executed, so that the execution of the program for the present control period is finished without executing any substantial processing in Step 104.

If the aforesaid wire cut/removal process is executed, a machining program block including the wire extension command M60 is read in Step 100 for a subsequent control period, so that the result of determination in Step 112 for this control period is positive. In this case, a wire extension process is executed in Step 112. More specifically, the wire stretched between the upper and lower wire guides by the operation of the wire extension device is fed between the paired belts of the wire transportation device which are located on the lower-course side of the lower wire guide. Then, the wire held between the two belts is fed thereby between a pair of feed rollers arranged on the lower-course side of the belt pair. As the paired rollers rotate, the wire reaches the wire recovery box. When the wire stretch process is finished in this manner, the paired belts are driven in directions to recede from each other, so that the wire is disengaged from the belt pair.

When the wire extension process in Step 112 is finished, the CPU 10, seeing that the belt pair has been used once in the wire extension process, adds the value "1" to the variable T(7) indicative of the cumulative frequency of use of the belts, thereby updating this variable (Step 113), and then executes Step 114 corresponding to Step 108 for the aforesaid determination, thereby determining whether the life of the belt pair has terminated. If necessary, moreover, the CPU 10 executes Step 115 corresponding to Step 109 for the aforesaid alarm indication, thereby turning on a corresponding one of the light emitting diodes in case of a termination of the life of the belt pair. Thereupon, the execution of the program for the present control period is finished.

When the wire extension is finished in this manner, regular electrical discharge machining is executed. During the electrical discharge machining, the CPU 10 periodically executes the control program of FIGS. 5 and 6.

If it is concluded that a program end command M20 is included in the machining program block read in Step 100 for a subsequent control period (Step 103), the CPU 10 stops the aforesaid timer and sets the index N to "1"

(Steps 116 and 117), and reads the variable T(1), indicative of the cumulative working period of the wire guides before the start of the present cycle of electrical discharge machining, from the nineteenth memory region of the management table 20 which corresponds to the index N (=1). Seeing that the wire guides have been continually used during the electrical discharge machining, the CPU 10 adds the present electrical discharge machining execution time T, metered by means of the timer, to the variable T(1), thereby updating this variable to a value indicative of the cumulative working period of the wire guides before the end of the present cycle of electrical discharge machining (Step 118). In Step 118 corresponding to Steps 108 and 114 for the aforesaid determination, the allowable wire guide working period and the updated cumulative wire guide working period are compared to determine whether the life of the wire guides has terminated. If necessary, moreover, Step 120 corresponding to Steps 109 and 115 for the aforesaid alarm indication is executed. In case of a termination of the life of the wire guides, the data S(1) of the value "1," indicative of the termination of the wire guide life, is written in the twentieth memory region of the management table 20, and a corresponding one of the light emitting diodes is turned on.

Subsequently, in Step 121, whether the index N is equal to the value "5" is determined. Since the result of determination in this step is negative, the value "1" is added to the index N in Step 122. Thereafter, the program returns to Step 118 described above, whereupon a series of processes, including Step 119 for the life discrimination, Step 120 for the alarm indication, Step 121 for the index value discrimination, and Step 122 for the index renewal, is repeatedly executed until the index N attains the value "5." Thereupon, whether the respective lives of the feeders, filter, strainer, and ion exchanger have terminated is determined. If it is concluded that the life of any of these expendable parts has terminated, a corresponding one of the light emitting diodes of the indicating means 18 is turned on.

If any of the light emitting diodes is turned on in this manner, the operator can easily ascertain the time of termination of the life of the corresponding expendable part, that is, the time for replacement. After replacing this part, the operator operates the machine control panel 17, thereby causing the same to write a variable of the value "0," indicative of the virginity of a replacing part, in a corresponding one of the nineteenth to twenty-fifth memory regions of the management table 20, and to write part life retention/end indicating data of the value "0," indicative of the retention of the life of the replacing part, in a corresponding one of the twenty-sixth to thirty-second memory regions of the management table 20. If the allowable working period or allowable frequency of use of the replacing part is different from that of the replaced one, the initial value stored in a corresponding one of the twelfth to eighteenth memory regions of the management table 20 is updated to a required value.

If data of the value "1," indicative of the end of the part life, is stored in any of the twenty-sixth to thirty-second memory regions of the management table 20 during the preceding cycle of electrical discharge machining, the CPU 10 turns on the light emitting diode corresponding to the exhausted part at the time of connecting the electrical discharge machine to the power supply, although an illustration and a detailed description are omitted herein.

Figure 2:
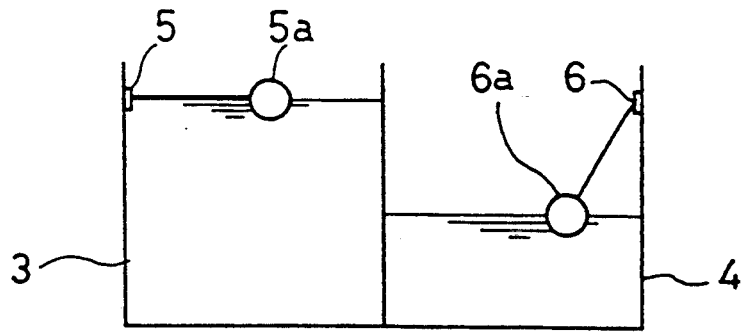
FIG. 2 is a schematic sectional view showing water level detectors attached to the electrical discharge machine of FIG. 1 and their peripheral elements, in which the stored water level of a first tank is lowered.
Figure 3:
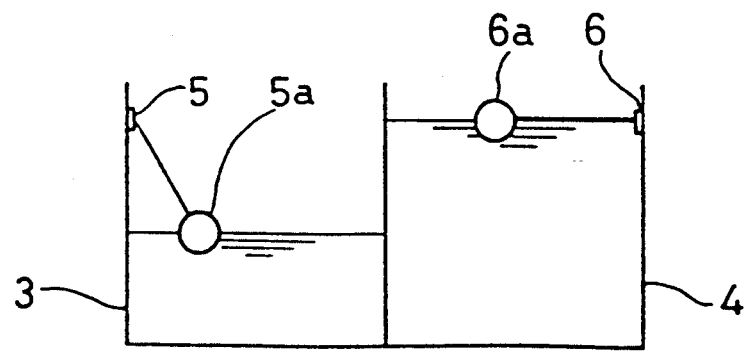
FIG. 3 is a schematic view similar to FIG. 2, showing a state in which the stored water level of a second tank is lowered.

If the circulation of the machining fluid (water) in the machining fluid supplying device or between the machining fluid supplying device and the electrical discharge machine body 2 gets out of order, the water level in the first tank 4 becomes much lower than the water level in the second tank 3, as shown in FIG. 2. If the machining fluid is in short supply, moreover, the water level in the second tank 3 becomes much lower than the water level in the first tank 4, as shown in FIG. 3. If the water level in either tank drops thus extraordinarily below a predetermined water level, an output signal indicative of a water level drop is delivered from a corresponding one of the water level detectors 5 and 6. On receiving the output signal of the water level detector through the interface 14, the CPU 10 turns on the light emitting diode corresponding to the tank suffering the water level drop, thereby warning of the extraordinary water level drop. As a result, the operator can quickly cope with the water level drop. The water level detectors 5 and 6 may alternatively be connected directly to their corresponding light emitting diodes so that these light emitting diodes can be turned on.

The present invention is not limited to the embodiment described above, and various modifications may be effected therein.

For example, although the case in which the present invention is applied to the wire-cut electrical discharge machine has been described in connection with the above embodiment, the invention may be applied to electrical discharge machines of any other types. In the above embodiment, moreover, the seven expendable parts including the upper and lower wire guides are regarded as the objects of management. The present invention is not limited to this, however, and any other expendable parts, such as bearings, may be included in the objects of management. In the embodiment described above, furthermore, the cumulative working period at the end of electrical discharge machining, obtained by adding the working period of each expendable part subjected to the electrical discharge machining to the cumulative working period before the start of the electrical discharge machining, is compared with the allowable working period to determined whether the life of the expendable part has terminated. Alternatively, however, the same processing may be executed during the electrical discharge machining. Moreover, whether the life of each part has terminated may be determined by obtaining the residual working period during or at the end of the electrical discharge machining and the residual frequency of use at the end of the wire cut/removal process by substracting the working period and the frequency of use associated with the electrical discharge machining and the aforesaid process from the residual working period and the residual frequency of use at the start of the electrical discharge machining. In this case, the allowable working period and the allowable frequency of use are set as the residual working period and the residual frequency of use, respectively, at the time of delivery of the electrical discharge machine and at the time of replacement of the parts.

I claim:

1. In an electrical discharge machine having at least one of first and second part groups, said first part group including at least one expendable part continually used during electrical discharge machining, said second part group including at least one expendable part used as required during the operation of said electrical discharge machine, the electrical discharge machine with a management information indicating function comprising:

detecting means for executing detection of a working period of said at least one expendable part, included in said first part group, during the time interval between start of electrical discharge machining and a first predetermined point of time, and/or detection of frequency of use of said at least one expendable part, included in said second part group, during the time interval between start of operation of said electrical discharge machine and a second predetermined point of time;

updating means for updating a corresponding one of a cumulative working period and a cumulative frequency of use of each said expendable part in accordance with a corresponding one of the detected working period and the detected frequency of use;

discriminating means for making comparison between said updated cumulative working period and an allowable working period of said expendable part and/or comparison between said updated cumulative frequency of use and an allowable frequency of use of said expendable part, thereby determining whether life of each said expendable part has terminated; and indicating means for indicating a termination of the life of each said expendable part in accordance with result of the determination by said discriminating means.

2. An electrical discharge machine with a management information indicating function according to claim 1, wherein said first predetermined point of time is a time for the end of the electrical discharge machining.

3. An electrical discharge machine with a management information indicating function according to claim 1, wherein said electrical discharge machine includes a machining fluid supplying device having a machining fluid reservoir and adapted to supply a machining fluid to a predetermined region of said electrical discharge machine, and second detecting means for detecting a storage level of the machining fluid in said machining fluid reservoir, said discriminating means compares the machining fluid storage level thus detected and a predetermined level, and said indicating means indicates an extraordinary drop of said machining fluid storage level in accordance with result of the comparison.

4. An electrical discharge machine with a management information indicating function according to claim 2, wherein said electrical discharge machine includes a machining fluid supplying device having a machining fluid reservoir and adapted to supply a machining fluid to a predetermined region of said electrical discharge machine, and second detecting means for detecting a storage level of the machining fluid in said machining fluid reservoir, said discriminating means compares the machining fluid storage level thus detected and a predetermined level, and said indicating means indicates an extraordinary drop of said machining fluid storage level in accordance with result of the comparison.

* * * * *